(12) United States Patent
Luo

(10) Patent No.: US 11,040,702 B2
(45) Date of Patent: Jun. 22, 2021

(54) FLAT-PUSH WINDSHIELD WIPER JOINT

(71) Applicant: Xiangdong Luo, Zhejiang (CN)

(72) Inventor: Xiangdong Luo, Zhejiang (CN)

( * ) Notice: Subject to any disclaimer, the term of this patent is extended or adjusted under 35 U.S.C. 154(b) by 301 days.

(21) Appl. No.: 16/251,091

(22) Filed: Jan. 18, 2019

(65) Prior Publication Data
US 2020/0180565 A1    Jun. 11, 2020

(30) Foreign Application Priority Data

Dec. 6, 2018   (CN) .......................... 201811486157.4

(51) Int. Cl.
*B60S 1/38*    (2006.01)
*B60S 1/40*    (2006.01)

(52) U.S. Cl.
CPC ........... *B60S 1/3858* (2013.01); *B60S 1/4083* (2013.01)

(58) Field of Classification Search
CPC ......... B60S 1/3858; B60S 1/40; B60S 1/4083
See application file for complete search history.

(56) References Cited

U.S. PATENT DOCUMENTS

| 2015/0329087 | A1* | 11/2015 | Young, III | ............. | B60S 1/381 |
| | | | | | 15/250.201 |
| 2016/0107616 | A1* | 4/2016 | Young, III | ............ | B60S 1/4003 |
| | | | | | 15/250.33 |
| 2016/0375868 | A1* | 12/2016 | Jomard | ................. | B60S 1/3891 |
| | | | | | 15/250.361 |
| 2018/0105144 | A1* | 4/2018 | Yee | ........................... | B60S 1/38 |
| 2018/0236979 | A1* | 8/2018 | Kim | ........................ | B60S 1/381 |

* cited by examiner

*Primary Examiner* — Michael D Jennings

(57) ABSTRACT

A flat-push windshield wiper joint, comprising a base and a mounting base, wherein a slot is formed from the left end to the right end of said base. The position of said slot matching the left end of base is an opening. The top surface of said base sinks to form spaced slide opening and chucking hole. Said slide opening and chucking hole are distributed in the extending direction of slot, and a stop bar is formed between the slide opening and chucking hole. Said locating bar matches the locating slot in the bottom surface of slot. The present invention can increase the assembly efficiency of flat-push windshield wiper joint and reduce the production costs.

5 Claims, 4 Drawing Sheets

FLAT-PUSH WINDSHIELD WIPER JOINT

BACKGROUND OF INVENTION

1. Field of the Invention

The present invention relates generally to the technical field of automobile accessories, and more particularly to a flat-push windshield wiper joint.

2. Description of Related Art

The windshield wiper joint is an important component of windshield wiper. The assembly simplicity of windshield wiper joint in the practice influences the working efficiency and manufacturing cost directly.

The overall structure of the existing windshield wiper joint is relatively complex, the assembly of parts and components is relatively complicated, so that the manufacturing cost is increased.

SUMMARY OF THE INVENTION

The present invention is to solve such technical problems as complex structure, inefficient assembly and high manufacturing cost in the existing flat-push windshield wiper joint.

In order to solve the above problems, the technical scheme of the present invention is described below.

A flat-push windshield wiper joint, comprising: a base and a mounting base; wherein the base is formed with a slot from a left end to a right end, the slot matching to the left end of the base is an opening, a top surface of the base is recessed downward to form a sliding hole and a locking hole; the sliding hole and the locking hole are distributed along the extending direction of the slot, and a baffle is formed between the sliding hole and the locking hole; the width of the sliding hole is smaller than the width of the slot, so that the sliding hole and the slot form a guiding groove having a cross section of "T" shape; the bottom surface of the slot has a through hole facing the locking hole;

wherein the mounting base includes an insert plate and a holder disposed on a top surface of the insert plate, and two sides of the insert plate are respectively provided with, guiding strips matching the slots, and the width of the insert plate is matched with the sliding hole; a buckle is disposed at a right end of the insert plate, the buckle is matched with the locking hole, and an elastic neck is disposed between the buckle and the right end of insert plate; the bottom end of the right end of the inserting plate is provided with a positioning strip, and the positioning strip is matched with the positioning groove of the bottom surface of the slot.

More particularly, wherein the slot is curve shape, the left end corresponding to the opening of the slot is symmetric with the right end of the slot corresponding to the locking hole, respectively being the two highest points of the curve shape, and correspondingly, the guiding strips are curve shape.

More particularly, wherein the two sides of the bottom surface of the slot are respectively include a row of holes, and the row of holes is consistent with the track of the slot; the positioning groove is matched with the left end of the row of holes.

More particularly, wherein the right end of the guiding strips has a chamfer.

More particularly, wherein the buckle has a rounded hook between the elastic neck, and the rounded hook is engaged with the baffle.

Benefits of the Present Invention

In comparison to the existing technology, the flat-push windshield wiper joint of the present invention has simpler and convenient assembly of mounting base and base, high working efficiency, the quick inserting of mounting base and base is implemented by flat-push, and the cambered slot and cambered guiding strips make the combination stability higher. Finally, the buckle and locking hole, positioning strip and positioning groove implement relative fixing.

In terms of the flat-push windshield wiper joint of the present invention, two holes in pattern increase the elastic deformation performance of slot bottom surface, enhancing the assembly smoothness of mounting base.

DETAILED DESCRIPTION OF THE INVENTION

Figure 1:
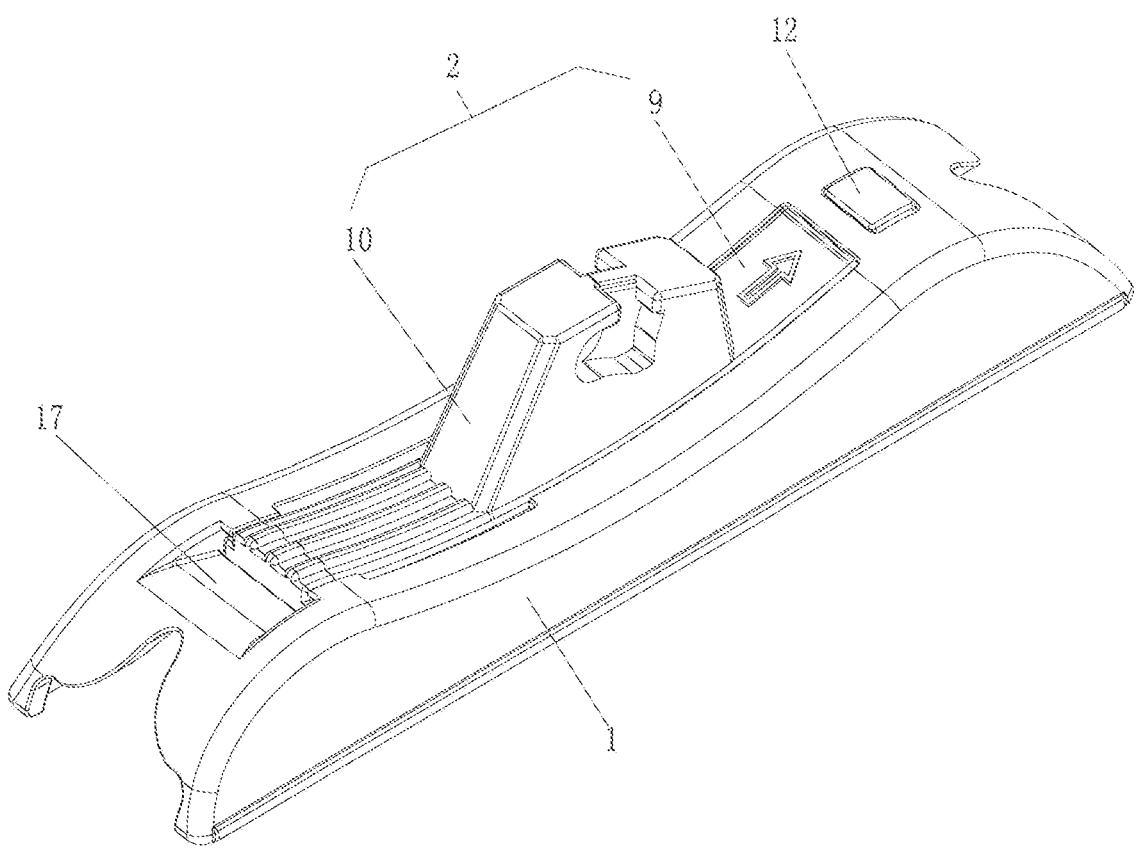
FIG. 1 is a stereogram of flat-push windshield wiper joint of the present invention.
Figure 2:
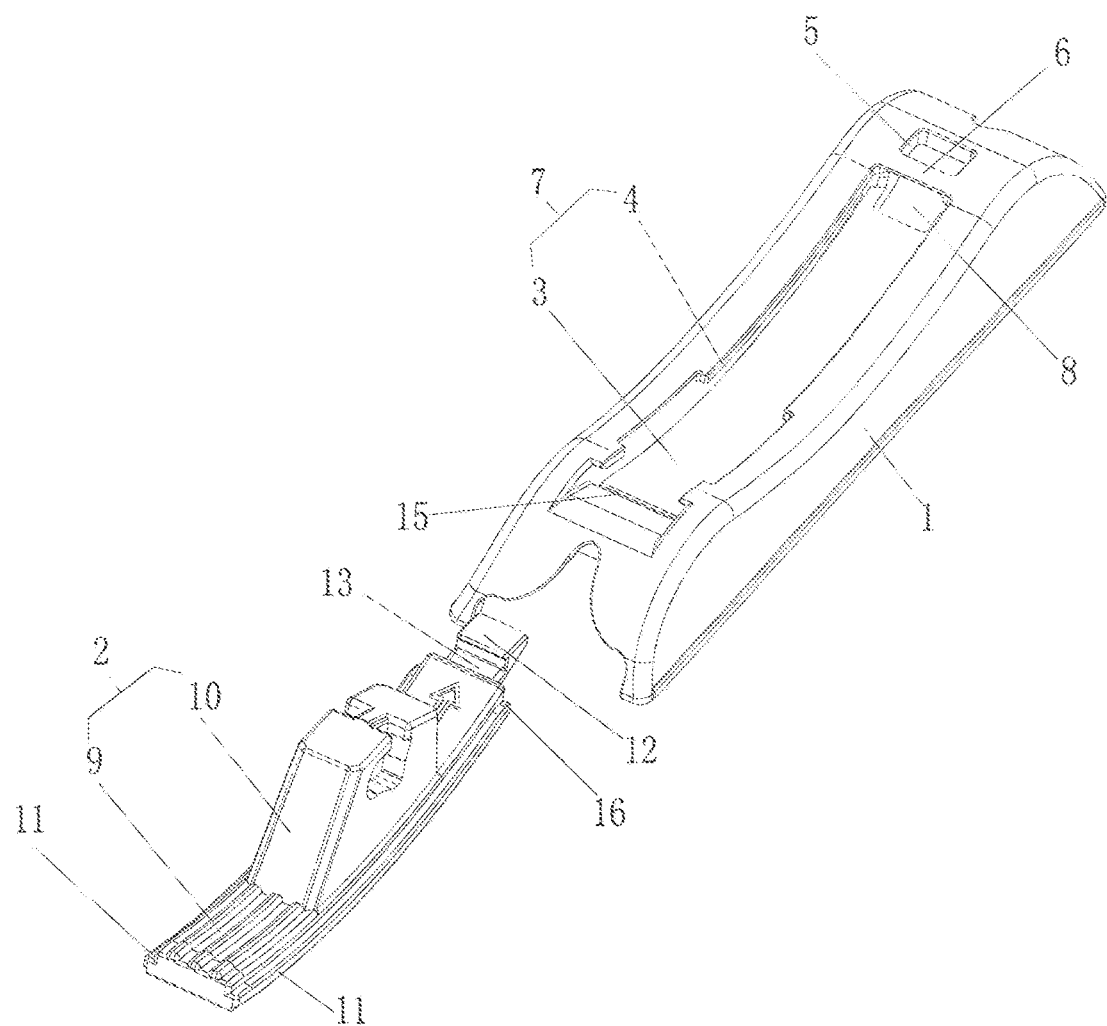
FIG. 2 is a three-dimensional exploded diagram of flat-push windshield wiper joint of the present invention.
Figure 3:
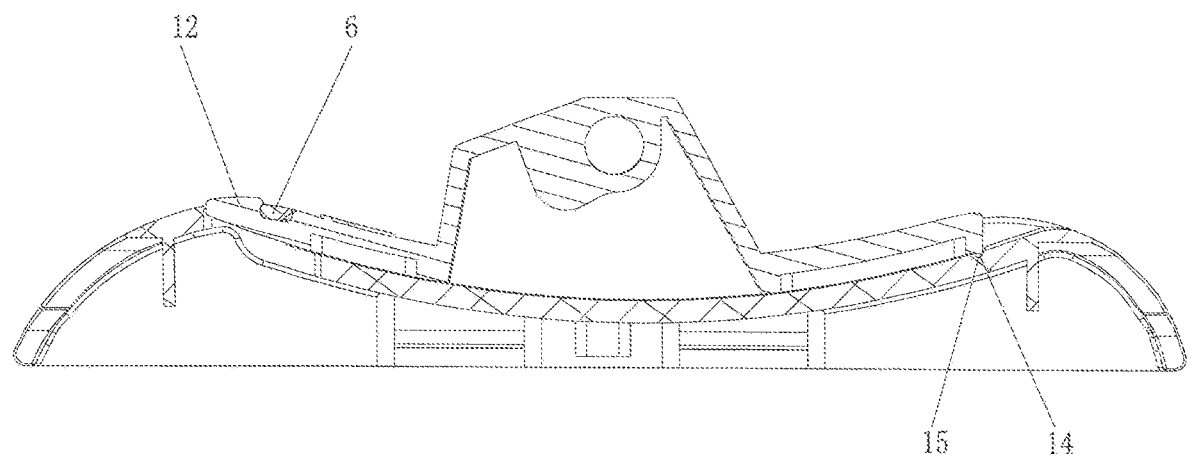
FIG. 3 is a sectional view of flat-push windshield wiper joint of the present invention.
Figure 4:
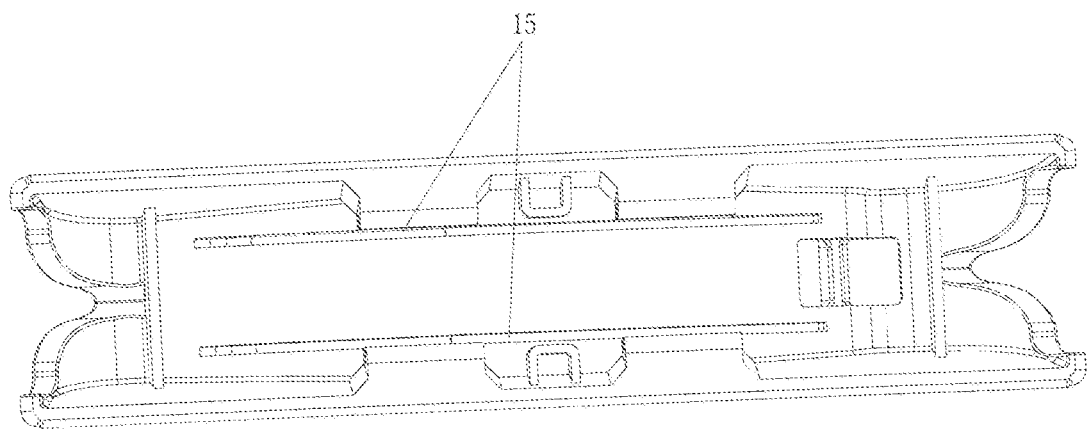
FIG. 4 is a stereogram in bottom view of the base of flat-push windshield wiper joint of the present invention.
Figure 5:
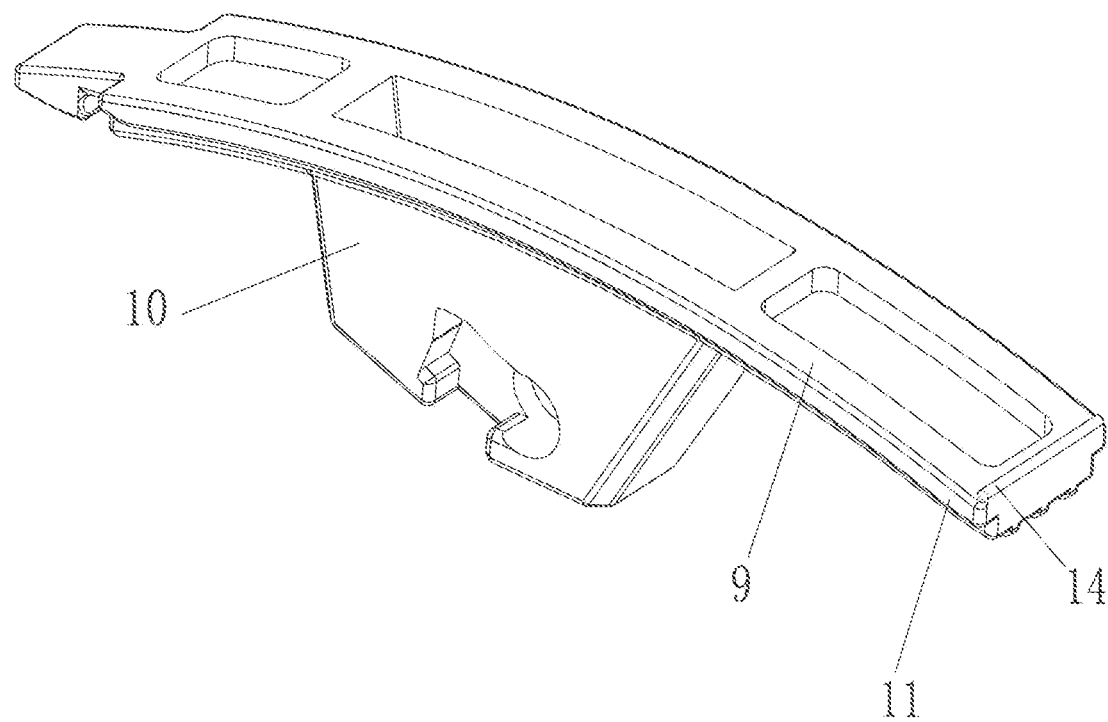
FIG. 5 is a stereogram of the mounting base of flat-push windshield wiper joint of the present invention.
Figure 6:
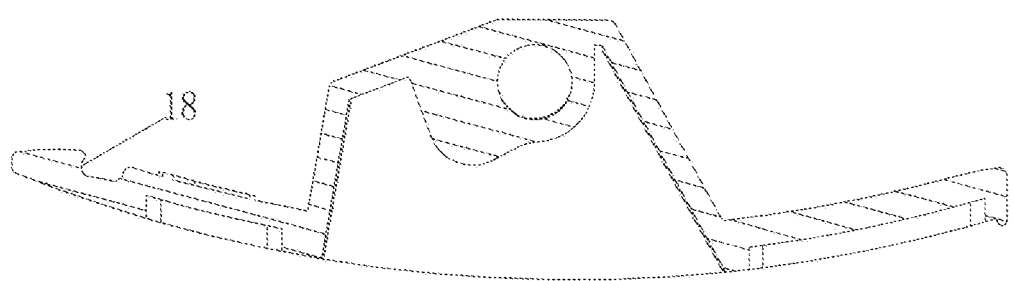
FIG. 6 is a sectional view of the mounting base of flat-push windshield wiper joint of the present invention.

Described with attached figures below:

FIG. 1 to FIG. 6 show a flat-push windshield wiper joint, comprising a base 1 and a mounting base 2. A slot 3 is formed from the left end to the right end of the base 1. The position of the slot 3 matching the left end of base 1 is an opening 17. The top surface of the base 1 sinks to form spaced sliding hole 4 and locking hole 5. The sliding hole 4 and locking hole 5 are distributed in the extending direction of slot 3, and a baffle 6 is formed between the sliding hole 4 and locking hole 5. The width of the sliding hole 4 is smaller than the width of slot 3, so that the sliding hole 4 and slot form a guiding groove 7 in T section, There is a through hole 8 in the bottom surface or the slot 3 over against the locking hole 5.

The mounting base 2 comprises an insert plate 9 and a holder 10 located on the top surface of insert plate 9. Guiding strips 11 matching the slot 3 is located on both sides of the insert plate 9. The width of insert plate 9 matches the sliding hole 4. A buckle 12 is located in the right end of insert plate 9. The buckle 12 matches the locking hole 5. There is an elastic neck 13 between the buckle 12 and the right end of insert plate 9. The bottom of right end of the insert plate 9 is provided with a positioning strip 14, The positioning strip 14 matches the positioning groove 15 in the bottom surface of slot 3.

The trace of the slot 3 is cambered, the left end corresponding to the opening 17 of slot 3 is symmetric to the right end of slot 3 corresponding to locking hole 5, which are the two vertices of arc, correspondingly, the guiding strips are curved shape. The arc structure further stabilizes the combination of base 1 and mounting base 2, increases the supporting strength of base 1, and prolongs the service life.

Both sides of bottom surface of the slot 3 are provided with holes in pattern 15. The holes in pattern 15 are coincident with the trace of slot 3. The positioning groove 15 matches the left end of holes in pattern 15. The design of holes in pattern 15 makes the bottom plate with the bottom surface of slot 3 have a certain elasticity, neutralizing the dimensional error resulted from production when matching the bottom surface of mounting base 2 to the bottom plate of slot 3, so as to increase the product assembly yield.

The right end of the guiding strips 11 has a chamfer 16. The chamfer 16 makes the guiding strips 11 enter the guiding groove 7 faster and smoother, easier to be inserted into slot 3.

There is a rounded hook 18 between the buckle 12 and, elastic neck 13, the rounded hook 18 clamps the baffle 6. The design of rounded hook 18 makes the combination of buckle 12 and baffle 6 firmer, so that the mounting base 2 and base 1 are connected more firmly.

The principle of structure is described below.

To assemble the flat-push windshield wiper joint of the present invention, one end of mounting base 2 with buckle 12 is aligned with the opening 17 of slot 3 of base 1, and then the guiding strips 11 on both sides of insert plate 9 are stuck in slot 3. As the end of guiding strips 11 has a chamfer 16, the guiding strips 11 can be inserted into slot 3 easily. Afterwards, the mounting base 2 is pushed along the slot 3. Finally, the buckle 12 is extruded by baffle 6, based on elastic neck 13, the buckle 12 is pressed down to pass by the baffle 6. When the buckle 12 reaches the locking hole 5, under the effect of elastic neck 13, the buckle 12 is resetted in locking hole 5. The through hole 8 under the locking hole 5 becomes the space for pressing down buckle 12. When the buckle 12 matches the locking hole 5 the positioning strip 14 is stuck in the positioning groove 15.

The aforementioned introduction is helpful to understanding the technical proposal of the present invention, not to limit the scope of patent, so any equal changes approximate to the present invention are still in the scope of patent of the present invention.

The above only describes some exemplary embodiments of the present invention. Those having ordinary skills in the art may also make many modifications and improvements without departing from the conception of the invention, which shall all fall within the protection scope of the invention.

I claim:

1. A flat-push windshield wiper joint, comprising:
a base and a mounting base;
wherein the base is formed with a slot from a left end to a right end, the slot matching to the left end of the base is an opening, a top surface of the base is recessed downward to form a sliding hole and a locking hole; the sliding hole and the locking hole are distributed along the extending direction of the slot, and a baffle is formed between the sliding hole and the locking hole; the width of the sliding hole is smaller than the width of the slot, so that the sliding hole and the slot form a guiding groove having a cross section; the bottom surface of the slot has a through hole facing the locking hole;
wherein the mounting base includes an insert plate and a holder disposed on a top surface of the insert plate, and two sides of the insert plate are respectively provided with guiding strips matching the slots, and the width of the insert plate is matched with the sliding hole; a buckle is disposed at a right end of the insert plate, the buckle is matched with the locking hole, and an elastic neck is disposed between the buckle and the right end of insert plate; the bottom end of the right end of the inserting plate is provided with a positioning strip, and the positioning strip is matched with the positioning groove of the bottom surface of the slot.

2. The flat-push windshield wiper joint according to claim 1, wherein the slot is curve shape, the left end corresponding to the opening of the slot is symmetric with the right end of the slot corresponding to the locking hole, respectively being the two highest points of the curve shape, and correspondingly, the guiding strips are curve shape.

3. The flat-push windshield wiper joint according to claim 1, wherein the two sides of the bottom surface of the slot are respectively include a row of holes, and the row of holes is consistent with the track of the slot; the positioning groove is matched with the left end of the row of holes.

4. The flat-push windshield wiper joint according to claim 1, wherein the right end of the guiding strips has a chamfer.

5. The flat-push windshield wiper joint according to claim 1, wherein the buckle has a rounded hook between the elastic neck, and the rounded hook is engaged with the baffle.

* * * * *